United States Patent [19]
Slosberg et al.

[11] 4,447,484
[45] May 8, 1984

[54] FLAME-RESISTANT VINYL FOAM GASKET AND METHOD OF PREPARATION

[75] Inventors: David K. Slosberg, Atlanta; Gilbert S. Nowell, Marrietta, both of Ga.

[73] Assignee: Compo Industries, Inc., Waltham, Mass.

[21] Appl. No.: 478,788

[22] Filed: Mar. 25, 1983

[51] Int. Cl.³ .......................... B32B 3/10; B32B 5/28; B32B 31/26
[52] U.S. Cl. ...................... 428/137; 156/79; 174/66; 220/241; 428/290; 428/309.9; 428/314.4; 428/318.6; 428/332.7
[58] Field of Search ............ 428/74, 316.6, 285, 428/289, 290, 286, 312.6, 317.9, 322.7, 137, 309.9, 311.1, 311.5, 314.4, 314.8, 318.6; 156/78, 79; 174/66, 67; 220/241, 242

[56] References Cited
U.S. PATENT DOCUMENTS 3,574,021  4/1971  Van Buskirk ................... 428/319.7
4,081,579  3/1978  Queen et al. .................... 428/316.6
4,163,137  7/1979  Close, Jr. ........................ 220/242
4,175,154  11/1979 Faust et al. .................... 428/316.6
4,225,396  1/1984  Hartman ........................ 428/309.9
4,293,173  10/1981 Tricca ............................ 174/67

FOREIGN PATENT DOCUMENTS 1143109    2/1969  United Kingdom ........... 428/318.6
2019253A  10/1979  United Kingdom ................ 428/74

Primary Examiner—William J. Van Balen
Attorney, Agent, or Firm—Richard P. Crowley

[57] ABSTRACT

A flame-resistant vinyl-foam gasket material particularly for use as an insulating draft shield in electrical outlets and switch boxes, which gasket material comprises a layer of a flexible, vinyl-foam sheet material suitable for use as a gasket material, and containing a dimensionally stable, glass-fiber tissue sheet material integrally positioned and secured within the foam layer, the gasket material meeting the flame test standards of CSA C.22.2 No. 18 4.1.4.

21 Claims, 1 Drawing Figure

FLAME-RESISTANT VINYL FOAM GASKET AND METHOD OF PREPARATION

BACKGROUND OF THE INVENTION

Soft or flexible vinyl-foam materials typically are employed in a variety of forms, such as strips and sheets, for insulating, cushioning and other purposes. Such vinyl-foam material tends to melt and flow, on exposure to high temperatures or to open flame, and to lose shape and form and, thus, to contribute to its flammability. Flexible, vinyl-foam sheet materials are often die-cut, to provide sheet gasket materials of various shapes, and typically is die-cut for use as a draft shield in insulating electrical-switch and electrical-plug-outlet boxes to prevent air drafts and to conserve heat. While such flexible, polyvinyl-chloride foam sheet material as die-cut provides air-draft insulating properties, the vinyl-foam sheet is not dimensionally stable; that is, it changes in dimensions and is subject to shrinkage, when exposed to temperature changes. Further, the die-cut sheet gasket material, on exposure to open flame, particularly in a vertical configuration, tends to melt and flow and has less-than-desirable flame-resistance properties.

It is desirable to provide a new, improved, vinyl-foam gasket material, particularly a vinyl-foam gasket material which has increased flame resistance and improved dimensional stability.

SUMMARY OF THE INVENTION

The invention relates to a dimensionally stable, flame-resistant, vinyl-foam material and to a method of preparing such material. In particular, the invention concerns a dimensionally stable, flame-resistant, vinyl-foam gasket material and a method of preparing such material.

A novel, dimensionally stable, improved, flame-retardant or flame-resistant, vinyl-foam material and a method of preparing the same has been discovered, which vinyl-foam material, particularly in sheet form, comprises a flexible, vinyl-foam material particularly suitable for use as a gasket-type material in sheet or other form, and which material contains a high-melting-point, dimensionally stable, tissure sheet material integrally positioned and secured within the vinyl-foam material. In particular, it has been found that a flame-resistant, dimensionally stable, vinyl-foam sheet material, suitable for use as a gasket material, may be prepared by incorporating within the sheet material a high-melting-point, dimensionally stable, tissue sheet material typically of glass fibers, which tissue sheet material is integrally positioned and secured within the vinyl-foam sheet material during the process of manufacturing the material.

The improved vinyl-foam gasket material of the invention, particularly in molded, die-cut form, and used, for example, as an air-draft shield gasketing material for electrical-switch and electrical-plug outlets, provides for improved dimensional stability, in that the changes in the dimension of the resulting reinforced vinyl-foam gasket material are substantially less than the vinyl-foam material without the tissue sheet material. In addition, the vinyl-foam material fo the invention has improved flame resistance and flame retardance, when exposed to open flame, particularly in a vertical configuration, and resists melting and subsequent flow of the vinyl foam. For example, the reinforced vinyl-foam material of the invention, which is useful as a gasket material, meets or exceeds the present Canadian Standards Association specifications C.22.2 No. 18 4.1.4 molded composition flame test, and, thus, is suitable for employment as air-draft insulating gasket material in Canada.

The method of preparing the dimensionally stable, flame-resistant, vinyl-foam material of the invention comprises providing an expandable liquid-vinyl plastisol or organosol composition, such as by forming a thin layer; for example, such as in a casting technique, of the expandable liquid-vinyl plastisol composition, and placing a high-melting-point, dimensionally stable tissue sheet material, having void interstices therein, onto the surface of the liquid plastisol composition, the tissue material wetted by the plastisol composition, and permitting the tissue sheet material to be penetrated by the plastisol composition to a desired depth with the plastisol composition, and, thereafter, heating the expandable plastisol composition to expand and fuse the plastisol and to provide a flexible foam material having the tissue sheet material integrally positioned and secured within the vinyl-foam material.

In one embodiment, a reinforced vinyl-foam sheet material, suitable for gasketing purposes, is prepared by forming a thin layer of an expandable liquid-vinyl plastisol composition, by casting the plastisol composition onto a release surface, such as a release paper, a fluorocarbon-coated belt, or stainless steel or other release carrier substrate, to form a layer of a desired thickness, such as, for example, 2 to 50 mils. The vinyl plastisol composition employed is controlled in viscosity; however, the viscosity may vary; for example, such as from 2000 to 20,000 cps, such as 7,000 to 12,000 cps. A tissue sheet material, such as, for example, a fiber-glass dimensionally stable sheet material having interstices therebetween, is placed onto the top surface of the layer of the liquid plastisol composition. The tissue sheet material is wetted by the plastisol and then penetrates the casting layer of the vinyl plastisol, the degree of saturation being governed by the viscosity and, optionally, the heat used on the top or bottom surface of the casting layer. The tissue sheet material is permitted to penetrate the layer of the plastisol material to the desired depth, and then the plastisol layer is gelled by heat; for example, 140° F. to 225° F., and subsequently heated to a higher temperature, to expand and to fuse the plastisol composition, to form a flexible sheet foam material on the release carrier. The soft or flexible sheet foam material is then stripped from the release carrier and subsequently is die-cut into the desired gasket form or shape.

The vinyl-foam sheet material so prepared has the tissue sheet material integrally positioned and secured at a desired depth within the foam layer, typically within 20% to 80% of the depth of the foam sheet material. The reinforced vinyl-foam sheet material then may be die-cut or otherwise formed into a gasket of desired shape. The gasket materials as thus prepared are unique in that the gasket material is dimensionally stable, in that shrinkage is substantially less than for the same vinyl-foam material without the reinforcing tissue sheet material therein. Further, the reinforced sheet material so prepared tends to retain its shape, particularly on exposure to open flame in a vertical configuration; thus, enhancing its flame resistance. The reiforced vinyl-foam sheet material used as a gasket material may vary in thickness, but typically, when employed in electrical outlets, for example, may range from 1/16th to ¼th of an inch in thickness, and such die-cut sheet gasket material is usually placed behind the switch plate or plug plate in the electrical-outlet box to prevent air drafts and, thus, to effect a saving of heat energy.

It is essential that the tissue sheet material employed in the vinyl-foam material is covered by both sides of the foam, in order to provide an effective gasket material of the invention, since the exposure of the smooth-skin top and bottom surfaces of the vinyl foam permits the soft foam to conform to the surface irregularities of the surface to which the gasket material is applied as a gasketing material. The position of the tissue material within the vinyl-foam material may be controlled by the viscosity of the plastisol or organosol composition. Optionally, it is useful to direct heat to the top, bottom or both surfaces of the cast plastisol layer, in order to reduce temporarily the viscosity of the plastisol or organosol composition, to permit the desired penetration of the tissue sheet material, and then to position the tissue sheet material by the subsequent heat-gelling of the plastisol or organosol composition, to secure the tissue sheet material in position. Thereafter, the reinforced, nonexpanded, vinyl-foam material may be expanded and fused, by heating, such as by passing it through a conventional hot-air oven.

The vinylplastisol or organosol compositions useful in preparing the vinyl-foam material of the invention typically comprise a polyvinyl-chloride dispersion-type resin, together with appropriate plasticizers, cell-control agents, stabilizing agents, activators, chemical blowing agents, pigments, flame retardants, smoke depressants and fire-retardant agents and, where desired, solvents or diluents, where the plastisol represents an organosol-type composition.

The tissue sheet material employed for reinforcing and for dimensional stability should be a nonflammable or very high-melting-point-type semirigid or dimensionally stable material composed of fibrous materials having void spaces therebetween, either in woven or nonwoven form. The tissue sheet material may vary in thickness, such as, for example, 10 to 100 mils, and more typically 20 to 60 mils, and should be of a material wetted by the plastisol composition, to permit the plastisol composition to penetrate the interstices between the fibers and through the void spaces in the sheet material. The fibrous material employed may vary and, for example, may comprise glass fibers, spun, bonded polyester fibers or other inorganic or organic fibrous materials which are retained in a stable structural integrity and In one embodiment, it has been found that woven; that is, screen, and more particularly nonwoven glass-fiber tissue sheet materials are useful, particularly where the glass fibers are held in a structural integrity and dimensional stability by the employment of binder materials, such as a thermosetting binder material like a melamine or urea-formaldehyde resin, which retains the glass fibers in a relatively stiff, structurally stable position and yet provides high void interstices between the fibers. A suitable material for use in the practice of the invention would include, for example, but not be limited to, a nonwoven, glass-fiber tissue sheet material by Johns-Manville Co. and manufactured by the Schuler process and known as a fiber-glass specialty mat material No. 7513, having a weight per square yard of approximately 1.30 ounces. Since such tissue material is generally nonextensible and dimensionally stable, careful guiding and tension control is required of such material, when it is laid on the top surface of the plastisol layer. Generally, a noncontacting roller is employed, which roller is placed in a close position; for example, $\frac{1}{8}$ to 2 inches from the top surface of the plastisol material, and the tissue sheet material is directed at an angle into the top surface of the plastisol material, using controlled tension and guiding means, with an uneven feed of the material avoided, in order to avoid wrinkles and other defects.

The Canadian standards for molded compositions, such as flexible, vinyl-foam sheet materials employed as insulating in electrical boxes, set forth the following tests under CSA standard C.22.2 No. 18 4.1.4 molded compositions:

4.1.4 Molded Composition 4.1.4.1. If a molded composition material is used, it shall be such that it will not support combustion for more than 1 minute after five 15-second applications of a standard test flame, the period between each two applications of the flame being 15 seconds.

4.1.4.2. The flame test shall be conducted on a 4-inch square sample of the molded composition in sheet form having a thickness equal to a minimum thickness used for the box.

4.1.4.3. The apparatus for the flame test shall consist of a Tirrill burner with an attached pilot, mounted on a 20-degree-angle block, the burner having a nominal bore of $\frac{3}{8}$ inch and a length of approximately 4 inches above the primary air inlets. The height of the flame, with the burner vertical, shall be adjusted to 5 inches, with an inner cone $1\frac{1}{2}$ inches high.

4.1.4.4. The sample to be tested shall be so mounted that it will present a flat vertical surface to the flame, and the axis of the burner shall be at right angles to a horizontal line across the face of the sample. The top of the burner shall be located $1\frac{1}{2}$ inches away from the center of the front surface of the sample, as measured along the axis of the burner.

The invention will be described for the purpose of illustration only in connection with a particular embodiment; however, it is recognized that various changes and modifications may be made in the invention as illustrated, all falling within the spirit and scope of the invention.

BRIEF DESCRIPTION OF THE DRAWING

The drawing is a perspective view of a reinforced, vinyl-foam switch-plate gasket sheet material of the invention.

DESCRIPTION OF THE EMBODIMENTS

Figure 1:
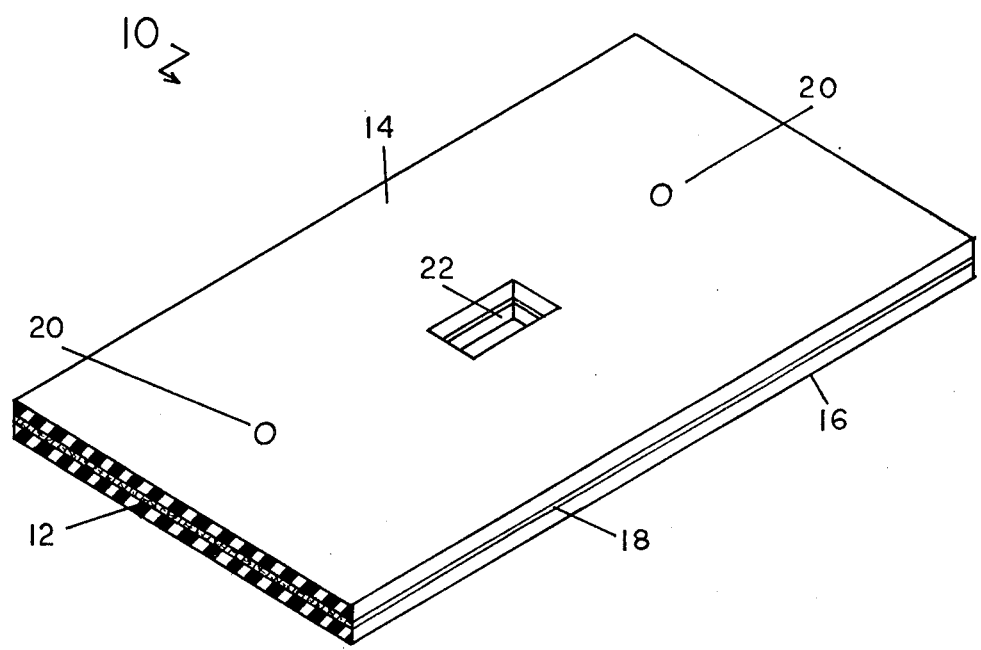

The drawing is a perspective, illustrative view of a die-cut, flexible, vinyl-foam, switch-plate gasket sheet material of the invention 10, having a layer of soft or flexible, substantially closed-cell, polyvinyl-chloride foam 12 of approximately 1/16th to $\frac{1}{8}$th of an inch in thickness, having an embossed top skin 14 and a smooth bottom skin 16 as stripped from a smooth release surface, and having a nonwoven, resin-binder, glass-fiber tissue sheet material 18 integrally positioned and secured intermediate within the foam layer 12. The switch plate is die-cut and provides a pair of screw holes 20 for the mounting of the switch plate in the electrical box, and an opening 22 for the projection of the electrical switch through the opening. Typically, a metal, solid or plastic switch plate is placed over the top surface of the vinyl-foam sheet material.

EXAMPLE 1.

A nonreinforced, vinyl-foam sheet material is prepared by high-speed mixing of the following ingredients, to provide a vinyl plastisol composition having a viscosity of about 7500 cps.

| | Ingredients | Percent by weight |
|---|---|---|
| 1. | Resin - polyvinyl-chloride dispersion resin, medium molecular weight (Geon 184 - B. F. Goodrich Chemical Co.) | 46.2% |
| 2. | Plasticizer | |
| | (a) linear alkyl phthalate Santicizer S711 Monsanto Co. | 19.3% |
| | (b) epoxidized soya plasticizer Argus Drapex 6.8 | 2.0% |
| | (c) cresyl diphenyl phosphate Santicizer S141 Monsanto Co. | 13.1% |
| 3. | Cell stabilizer-low-molecular-weight polymer (or silicon surfactant) (VS103C - Air Products Co.) | 0.6% |
| 4. | Stabilizer and activator-zinc organic complex (Argus 1501A) | 1.5% |
| 5. | Blowing agent-azodicarbonamide (Kempore 125 - Olin Corp.) | 3.5% |
| 6. | Pigment-titanium dioxide | 3.0% |
| 7. | Flame retardant-antimony oxide | 3.0% |
| 8. | Smoke suppressant and fire retardant aluminum trihydrate | 8.0% |
| | | 100.0% |

The plastisol is cast onto a continuous web of smooth release paper, at a casting weight of about 10.5 oz/sq yd, by means of a precision doctor blade over a roll coater. The liquid plastisol is fused and expanded, by heating the material to 370° F. in a gas-heated hot-air oven. The thickness is increased in this step from about 10 mils to about 95 mils, and the density is reduced from 80 lbs per cubic foot to about 8 lbs per cubic foot; for example, 6 to 20 lbs per cubic foot. After a cooling step, the foam is stripped from the release paper and then put into continuous rolls of desired lengths. These rolls of foam are subsequently die-cut into the desired gasket configurations.

EXAMPLE 2.

The same plastisol compositions as Example 1 is mixed and coated as in Example 1. In addition, immediately following the coating station, where the plastisol is case as a coating, a stiff, nonwoven, fiber-glass tissue (Johns-Manville No. 7513 fiber-glass specialty mat, 1.03 oz/sq yd) is laid into the liquid plastisol, using a noncontacting steel roller, The fiber-glass is nonextensible; therefore, careful guiding and tension control are required. The tissue is "wet-out" by the vinyl plastisol. The depth of the tissue sheet is controlled by viscosity of the plastisol and the tension on the tissue. The "wet-out" phase is made more effective by means of heated platens under the release-paper carrier. The added heat reduces the effective viscosity of the plastisol, allowing the vinyl compound to penetrate the interstices of the tissue. Further, bottom heat (for example, 160° F. to 190° F.) gels the plastisol, without substantial foam formation, fixing the location of the tissue. This stage is followed by fusion and expansion steps in an oven at higher temperatures. When the expansion is complete, the fiber-glass tissue is covered by vinyl foam on both sides. The cooled product is then stripped from the release paper and rolled to length. The rolls of reinforced foam are then die-cut into desired shapes. The tissue material is covered on both sides by soft vinyl foam, which is required to make an effective gasket; that is soft vinyl foam conforms to the surface irregularities of the surface to be insulated.

EXAMPLE 3.

A 4-inch-square sample of Example 1 was exposed in a vertical configuration to a Tirrill burner, as detailed in CSA standard C.22.2 No. 18 under 4.1.4 molded compositions. The test square melted and flowed away from the flame, after the second application of the flame (note five each 15-second applications are required).

EXAMPLE 4.

A 4-inch-square sample made in Example 2 was exposed to the flame in the same test as above. The test requirements of the CSA were met easily. There was no flow or melting away from the flame. The reinforced vinyl-foam material of Example 2 was stable and provides an effective reinforced gasket material of improved flame resistance.

What is claimed is:

1. A method of preparing a flame-resistant vinyl-foam sheet material, which method comprises:
   (a) forming a layer of an expandable, liquid-vinyl plastisol composition;
   (b) placing a fibrous tissue sheet material, having interstices therein, onto the top surface of the layer of the liquid plastisol composition, the tissue sheet material wetted by the plastisol composition, and permitting the liquid plastisol composition to penetrate the interstices of the tissue sheet material and the tissue sheet material to settle to a desired depth within the coating layer; and
   (c) heating the layer of the plastisol composition to a temperature to gel, expand and fuse the plastisol composition, to provide a flexible, tissue-reinforced, vinyl-foam sheet material having the tissue sheet material integrally positioned and secured within the foam layer.

2. The method of claim 1 which includes heating the top or bottom surface of the plastisol layer, to reduce the effective viscosity of the plastisol coating layer, and to control the position of the tissue sheet material within the vinyl-foam material.

3. The method of claim 2 which includes heating the top or bottom surface, using a heated platen or infrared heaters adjacent the bottom or top surface of the plastisol coating layer.

4. The method of claim 1 which includes casting the plastisol composition onto the surface of a release material and, after formation of the vinyl-foam sheet material, stripping the release material from the surface of the vinyl-foam material.

5. The method of claim 1 wherein the vinyl plastisol composition has a viscosity of from about 2000 to 20,000 cps.

6. The method of claim 1 wherein the tissue sheet material comprises a glass-fiber sheet material.

7. The method of claim 6 wherein the glass-fiber sheet material comprises a relatively stiff, thin, nonwoven, glass-fiber sheet material, the glass fibers secured and structurally retained through the employment of a thermosetting resin binder.

8. The method of claim 1 which includes die-cutting the flexible, vinyl-foam material into a gasket article.

9. The method of claim 8 which includes die-cutting the flexible, vinyl-foam gasket material into a gasket material for use in the insulation of an electrical-switch or electrical-plug plate draft material.

10. The method of claim 1 which includes heating the top or bottom surface of the plastisol layer, to get the plastisol composition and to secure the tissue sheet material in the desired position within the vinyl-foam layer.

11. The method of claim 10 wherein the tissue sheet material is positioned by gelling and intimately secured within 20% to 80% of the depth of the vinyl-foam sheet material.

12. A method of preparing a flame-resistant vinyl-foam gasket material, which method comprises:
(a) casting a thin layer of an expandable, liquid-vinyl plastisol composition onto the surface of a release material;
(b) placing a nonwoven, glass-fiber, structurally stable sheet material, having interstices therein, onto the top surface of the thin layer of the expandable vinyl plastisol composition, the glass-fiber tissue sheet material being wetted by the plastisol, and heating the top or bottom surface of the thin layer of the expandable vinyl plastisol composition, to reduce temporarily the viscosity thereof and to permit the glass-fiber tissue sheet material to position itself within the thin layer to the desired depth; and, thereafter,
(c) heating the layer of the expandable vinyl plastisol composition containing the glass-fiber tissue sheet material therein, to provide a flexible, insulating, substantially closed-cell, vinyl-foam sheet material having the glass-fiber tissue sheet therein integrally positioned and secured at the desired depth within the foam layer.

13. The method of claim 12 which includes stripping the flexible, insulating foam layer from the release surface and die-cutting the flexible, vinyl-foam insulating layer into a gasket material suitable for use for the insulation of electrical-switch and-outlet boxes.

14. The method of claim 12 wherein the flexible, insulating foam layer is characterized by meeting the flame test standards of the Canadian Standards Association C.22.2 No. 18 4.1.4.

15. The method of claim 1 which includes placing the fibrous tissue sheet material on the top surface of the layer of liquid plastisol, by directing the tissue sheet material at an angle into the top surface of the plastisol.

16. The method of claim 15 which includes directing the tissue sheet material, by employing a noncontacting roller placed above the top surface of the plastisol from about ⅛th to 2 inches from the top surface, and by employing controlled tension and guiding, to direct the tissue sheet material at an angle into the top surface of the plastisol material, to avoid wrinkling an uneven feed of the tissue sheet material.

17. The method of claim 15 wherein the tissue sheet material has a thickness of about 10 to 100 mils, the foam sheet material has a thickness of from about 1/16th of an inch, and the foam sheet material has a foam density of from about 6 to 20 pounds per cubic foot.

18. An air draft gasket sheet material suitable for use as an open flame resistant draft shield in electrical plug and switch outlets, which gasket sheet material consists essentially of:
(a) a flexible, substantially closed-cell, integrally-formed, single vinyl resin foam sheet material;
(b) a dimensional stable thin nonwoven thin glass fiber sheet material integrally bonded to and positioned within about 20 to 80% of the depth of the vinyl foam material;
(c) the gasket material characterized by an opening formed to fit about the projection of an electrical switch or electrical plug of the electrical outlet box in which the gasket material is to be employed as a draft shield, the gasket material having the exterior dimension to fit behind the switch plate or plut plate of an electrical outlet box to prevent air drafts; and
(d) the gasket material characterized by meeting the flame test standards of the Canadian Standards Association C.22.2 No. 18 4.1.4.

19. The gasket material of claim 18 which includes screw hole openings in the gasket material for screws to retain the gasket material in the electrical outlet box.

20. The gasket material of claim 18 wherein the gasket material has a top and bottom surface skin.

21. The gasket material of claim 18 which has a thickness of about 1/16 to ¼ of an inch and has a rectangular exterior dimension to fit a rectangular outlet box.

* * * * *

UNITED STATES PATENT AND TRADEMARK OFFICE
CERTIFICATE OF CORRECTION

PATENT NO. : 4,447,484

DATED : May 8, 1984

INVENTOR(S) : David K. Slosberg et al

It is certified that error appears in the above-identified patent and that said Letters Patent is hereby corrected as shown below:

Column 7, line 8, delete "get" and insert therefor --gel--.

Column 8, line 16, after "1/16th" insert therefor --to 1/4th--.

Column 8, line 34, delete "plut" and insert therefor --plug--.

Column 8, line 46, after "1/16" and before "to" insert a space.

Signed and Sealed this

Thirteenth Day of November 1984

[SEAL]

Attest:

GERALD J. MOSSINGHOFF

Attesting Officer

Commissioner of Patents and Trademarks